US006778699B1

(12) United States Patent
Gallagher (10) Patent No.: US 6,778,699 B1
(45) Date of Patent: Aug. 17, 2004

(54) METHOD OF DETERMINING VANISHING POINT LOCATION FROM AN IMAGE

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 607 days.

(21) Appl. No.: 09/675,826

(22) Filed: Sep. 29, 2000

Related U.S. Application Data

(60) Provisional application No. 60/192,195, filed on Mar. 27, 2000.

(51) Int. Cl.$^7$ .................................................. G06K 9/50
(52) U.S. Cl. ........................ 382/165; 382/201; 382/202
(58) Field of Search ................................ 382/201, 202, 382/162, 165, 100; 345/419

(56) References Cited

U.S. PATENT DOCUMENTS 6,011,585 A    1/2000  Anderson
6,304,298 B1 * 10/2001  Steinberg et al. ............ 348/587

FOREIGN PATENT DOCUMENTS

JP          03238566 A  * 10/1991  ............ G06F/15/70

OTHER PUBLICATIONS

Collins et al. "Vanishing Point Calculation as a Statistical Inference on the Unit Sphere." Proc. Third Int. Conf. on Computer Vision, Dec. 4, 1990, pp. 400–403.*
McLean et al. "Vanishing Point Detection by Line Clustering." IEEE Trans. on Pattern Analysis and Machine Intelligence, vol. 17, No. 11, Nov. 1995, pp. 1090–1095.*
Tuytelaars et al. "The Cascaded Hough Transform." Proc. Int. Conf. on Image Processing, vol. 2, Oct. 26, 1997, pp. 736–739.*
Minagawa et al. "Line Clustering with Vanishing Point and Vanishing Line." Proc. Int. Conf. on Image Analysis and Processing, Sep. 27, 1999, pp. 388–393.*
Yi–Kai Chen, et al., "Skew Detection and Reconstruction Based On Maximization of Variance of Transition–Counts," 1999 Pattern Recognition Society, pp. 195–208.
Stephen T. Barnard, "Interpreting Perspective Images," from Artificial Intelligence 1983, pp. 435–462.
Evelyne Lutton, et al., "Contribution to the Determination of Vanishing Points Using Hough Transform," 1994 IEEE vol. 16, No. 4, pp. 430–438.
M. J. Magee et al., "Determining Vanishing Points from Perspective Images," 1984, pp. 256–267.
Jefferey A. Shufelt, "Performance Evaluation and Analysis of Vanishing Point Detection Techniques," IEEE Transactions on Pattern Analysis and Machine Intelligence, vol. 21, No. 3, Mar. 1999, pp. 282–288.

* cited by examiner

Primary Examiner—Jon Chang
(74) Attorney, Agent, or Firm—Stephen H. Shaw (57) ABSTRACT

A method of determining a vanishing point related to an image, the method includes the steps of: detecting line segments in the image; determining intersections from pairs of line segments; assigning a probability to each intersection of the pairs of line segments; determining a local maximum corresponding to a plurality of probabilities; and outputting an estimated vanishing point vector $v_E$ that corresponds to the determined local maximum such that an estimated location of the vanishing point about the estimated vanishing point vector $v_E$ results.

36 Claims, 9 Drawing Sheets

METHOD OF DETERMINING VANISHING POINT LOCATION FROM AN IMAGE

CROSS REFERENCE TO RELATED APPLICATIONS

The present application is related to U.S. Provisional Application Serial No. 60/192,195, filed March 27, 2000 by Andrew C. Gallagher, entitled *Vanishing Point Detection by Training with Ground Truth Data*.

FIELD OF THE INVENTION

The present invention relates generally to the field of estimating the vanishing points of an image. More specifically, the present invention relates to applying a method to accurately locate the vanishing point.

BACKGROUND OF THE INVENTION

A vanishing point is a result of the perspective projection of a three dimensional scene onto a two dimensional image plane. A vanishing point refers to the point in the image plane (that is, a two dimensional projection of the three dimensional scene) where parallel lines in the scene meet. Vanishing points generally only have relevance for images containing a structure having at least two line segments. Consequently, line segments that are relevant to vanishing points may be constructed from images that include man-made structures.

Vanishing point detection in the field of camera technology is important because detecting the vanishing point of an image can be a significant first step in correcting for image rotation caused by a user's inability to hold the camera level. Several ideas and methods on how to detect vanishing points have been proposed and attempted.

Barnard, in "Interpreting Perspective Images", *Artificial Intelligence*, vol. 21 first proposed the idea of using a Gaussian sphere as an accumulator space for vanishing point detection. The "plane of interpretation" is identified as the plane passing through the center of the sphere (the origin or focal point of the optical system) and both ends of a particular line segment. Each bin of the Gaussian sphere accumulator that falls on the intersection of the Gaussian sphere and the interpretation plane (this intersection forms a great circle) is incremented. After this procedure is completed for all line segments, the vanishing points may be found by searching for local maxima on the sphere. The position of the local maximum represents the vanishing point vector. The location of the vanishing point in the image plane may be determined by projecting this vector back onto the image plane. One difficulty with Barnard's approach is that the partitioning of the Gaussian sphere causes non-uniform bin sizes that affect the final results.

Magee and Aggarwal, in "Determining Vanishing Points From Perspective Images," *Computer Vision, Graphics, and Image Processing*, vol. 26 propose a vanishing point detection scheme that is similar to Barnard's method, primarily because a Gaussian sphere is again utilized. However, in this method the Gaussian sphere is not used as an accumulator. In the Magee and Aggarwal method, cross products operations are performed in order to identify the intersections of line segments on the Gaussian sphere, and afterwards a list of all intersections of each pair of line segments is collected. A clustering operation is performed to find common intersections that are identified as possible vanishing points. Also, Magee and Aggarwal show that the algorithm is insensitive to focal length. Their method has several advantages. First, the accuracy of the estimated vanishing point is not limited to the quantization of the Gaussian sphere. Second, Magee and Aggarwal consider each intersection individually. Therefore, an intersection that is not feasible (for example, an intersection that occurs within the endpoints of one of the two component line segments) as a vanishing point may be rejected. This selection of feasible vanishing points is not possible with the accumulator space method of Barnard or Brillault and O'Mahony, which consider only line segments rather than intersections.

Lutton, Maitre, and Lopez-Krahe in "Contribution to the Determination of Vanishing Points Using Hough Transform," *IEEE Transactions on Pattern Analysis and Machine Intelligence*, vol. 16, no. 4 introduced a probability mask on the Gaussian sphere in order to compensate for the finite extent of the image. In Barnard's algorithm, the great circle associated with every line segment passes through the projection of the image onto the sphere. This makes the algorithm more likely to detect a vanishing point that falls within the image than outside of the image. The probability mask attempts to account for this effect by considering the probability of two random lines (i.e., noise) intersecting at any given place on the Gaussian sphere. However, the authors fail to take into consideration the prior probability of the actual vanishing point locations, and instead assume that all vanishing points are equally likely. This assumption is far from the actual case. In addition, the authors describe an effort to account for errors in line segment identification. Rather than incrementing only the bins falling on the great circle, the authors propose incrementing the bins falling in a swath about the great circle.

The swath size is determined by possible interpretation planes passing through the endpoints of the line segments. Consequently, longer line segments that have a higher degree of certainty, will cause incrementalism over a more narrow swath on the Gaussian sphere. A weight based on the line length is distributed evenly among all bins contained in the swath. However, this weighting scheme is based upon assumption rather than actual ground truth data. As an additional algorithm feature, three vanishing points corresponding with the three orthogonal dimensions are simultaneously detected. This feature adds robustness for scenes containing all dimensions, although, many scenes contain structure without containing all three dimensions. Additionally, this algorithm feature requires the use of an accurate focal length. Finally, this algorithm cannot calculate any single intersection of two line segments, thus omitting some of the advances made by Magee and Aggarwal.

Therefore, a need exists for overcoming the above-described drawbacks. In particular, a need exists for a method to determine the most likely vanishing point location while considering the collection of numerous intersections and conditional probabilities.

SUMMARY OF THE INVENTION

The above noted need is met according to the present invention by providing a method of determining a vanishing point related to an image, the method includes the steps of: detecting line segments in the image; determining intersections from pairs of line segments; assigning a probability to each intersection of the pairs of line segments; determining a local maximum corresponding to a plurality of probabilities; and outputting an estimated vanishing point vector $v_E$ that corresponds to the determined local maximum such that an estimated location of the vanishing point about the estimated vanishing point vector $v_E$ results.

As a new approach to vanishing point detection, ground truth data is utilized to establish conditional probabilities in a cross product scheme similar to Magee's. Features pertaining to the two line segments forming each intersection are used to determine the conditional probability that the intersection is coincident to a ground truth vanishing point. Weighted clustering is then performed to determine the most likely vanishing point location, considering the collection of intersections and conditional probabilities. This algorithm is based upon the ground truth vanishing point data derived from the 86 images in a training set. This algorithm represents the first reported use of ground truth data for training an automatic vanishing point detection algorithm.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The subject matter of the invention is described with reference to the embodiments shown in the drawings.

DETAILED DESCRIPTION OF THE INVENTION

In the following description, the present invention will be described in the preferred embodiment as a method. Those skilled in the art will readily recognize that the equivalent of such a method may also be constructed as hardware or software within the scope of the invention.

Note that the present invention describes a method of determining vanishing point locations for a digital image. The purpose of the preferred embodiment is to identify the location of the vanishing points of the digital image. As is well known in the art, a vanishing point is a result of the perspective projection of the three dimensional scene onto a two dimensional image plane. A vanishing point refers to the point in the image plane (a two dimensional projection of the three dimensional scene) where parallel lines in the scene meet. In general, line segments that are relevant to vanishing points are associated with man-made structures.

The method of the present invention may operate in hardware or software residing in any number of devices. For example, the present invention may be performed on an image in a photographic copier, a digital camera, within a film scanner, on a personal computer, and the like. This description of the present invention is by no means intended to limit the possibility of devices which the present invention may reside in.

The source of the digitized image is of no matter to this invention. The digitized image may be a scan of a film negative, a scan of a photograph, or an image captured with a digital camera. In addition, the digitized image may be created by a computer or artist. It should be well understood that in cases where the digitized image is a scan of a hardcopy image that the vanishing points of the digitized image corresponds to the vanishing points of the source image. In this case, the source image is the photograph and the digital image is a result of a scanning step. It should be further understood that the source image may be a digital image, for example, of large resolution. This source image may then be decimated to generate the digital image that the method of the present invention operates upon. Again, the result that the present invention determines applies to both the source image and the digital image that undergoes the method of the present invention. Note that the preferred embodiment is described with reference to digital images with dimensions 512 pixels by 768 pixels, although those skilled in the art will recognize that many image resolutions may be utilized with equal success. In addition, the preferred embodiment is described with reference to images having a 12 bit per pixel resolution.

Figure 1:
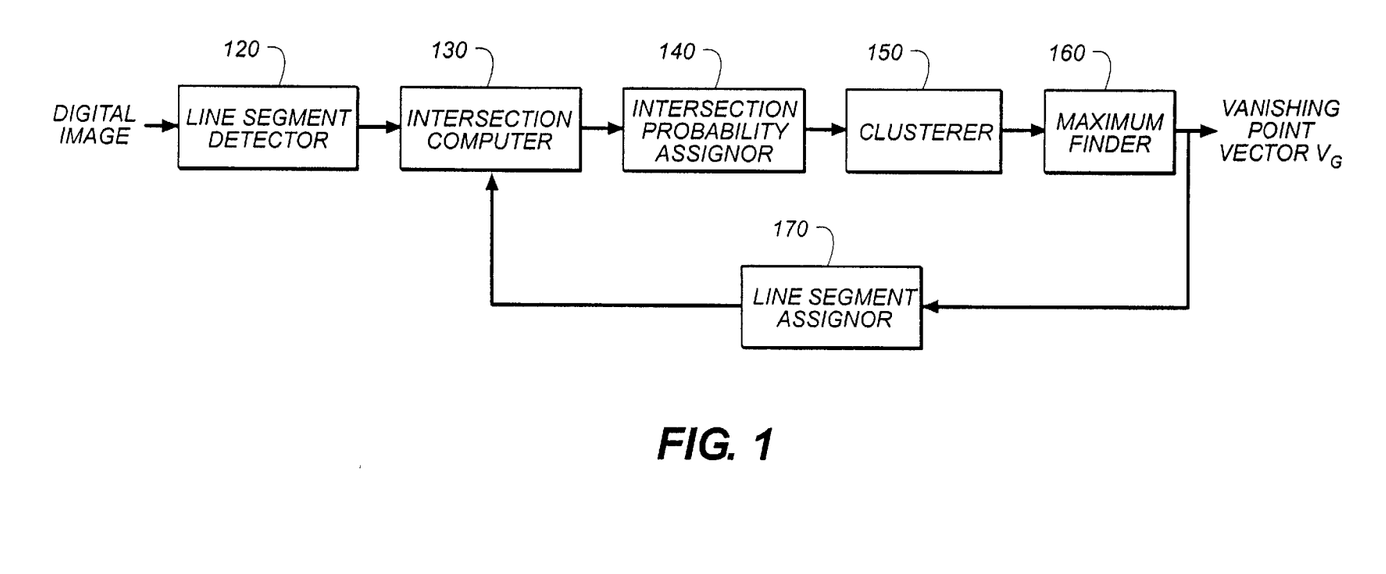
FIG. 1 is a block diagram of the present invention that provides a method of determining the location of a vanishing point within an image.

FIG. 1 shows a block diagram of the system according to the present invention. The purpose of the present invention is to automatically determine the locations of vanishing points in an image by examining the pixel values associated with the image. As shown in FIG. 1, a digital image channel is passed to a line segment detector 120. A digital image channel is the collection of pixel values in an array. The digital image channel may be the red, green, or blue image channel or a linear combination of these three channels. In the preferred embodiment, a luminance like digital image channel is created by taking the average of the red, green, and blue channels as follows:

$$n(x,y) = \frac{1}{3}(r(x,y) + g(x,y) + b(x,y))$$

where $n(x,y)$ represents the pixel value of the luminance channel at location $(x,y)$, $r(x,y)$ represents the pixel value of the red channel at location $(x,y)$, $g(x,y)$ represents the pixel value of the green channel at location $(x,y)$, and $b(x,y)$ represents the pixel value of the blue channel at location $(x,y)$.

Referring to FIG. 1, a system 100 for providing a vanishing point locator method, according to the present invention, includes a line segment detector 120, an intersection computer 130, an intersection probability assignor 140, a clusterer 150, a maximum finder 160, and a line segment assigner 170.

In operation, the line segment detector 120 determines line segments in the image. The line segment detector 120 which is described in more detail herein below, outputs a list of line segments that have been detected in the digital image channel. The list of line segments contains such line segment attributes or features as the line segment center, line segment slope, line segment length, line segment variance in the long direction, line segment variance in the short direction, and average color of the pixels of the line segment. The line segment detector 120 detects M line segments.

The list of line segments found by the line segment detector 120 is input to the intersection computer 130. The purpose of the intersection computer 130 is to find the intersection of each possible pair of line segments contained in the list. For M line segments there are M(M-1)/2 intersections. The intersection computer 130 also checks the validity of the intersection, and rejects intersections under certain conditions which will be described herein below. The intersection computer 130 outputs a list of all the valid intersections, of which there are a maximum of M(M-1)/2 to the intersection probability assignor 140.

The intersection probability assignor 140 assigns a posterior probability to each intersection. The assigned probability represents the probability of the particular intersection being coincident with a vanishing point. In order to assign this probability, the intersection probability assignor 140 utilizes several features derived from the characteristics of the intersection and the two line segments from which the intersection is calculated. This piece of the algorithm has been trained with ground truth data, as will be described in more detail herein below. The output of the intersection probability assignor 140 is the list of intersections and the corresponding probabilities.

The clusterer 150 inputs the list of intersections and the corresponding probabilities of the intersection probability assignor 140 and performs a clustering operation using the probabilities as weights. The W cluster means determined by the clusterer 150 are output to the maximum finder 160, along with the intersections and associated probabilities.

The maximum finder 160 considers a fixed region size about each cluster mean and determines a corresponding score. The score is based upon the number of intersections in the region about the cluster mean and the associated probabilities, as will be described in detail. The maximum finder 160 selects the cluster mean with the greatest score as the estimate of the vanishing point. Line segments may be assigned to the vanishing point by the line segment assigner 170, provided the line segments pass sufficiently close to the vanishing point. Unassigned line segments may be passed to the intersection computer 130 in order to estimate an additional vanishing point. This process may be repeated until desired, or until there are not enough unassigned line segments to form an intersection ( i.e. <2 line segments).

Figure 2:
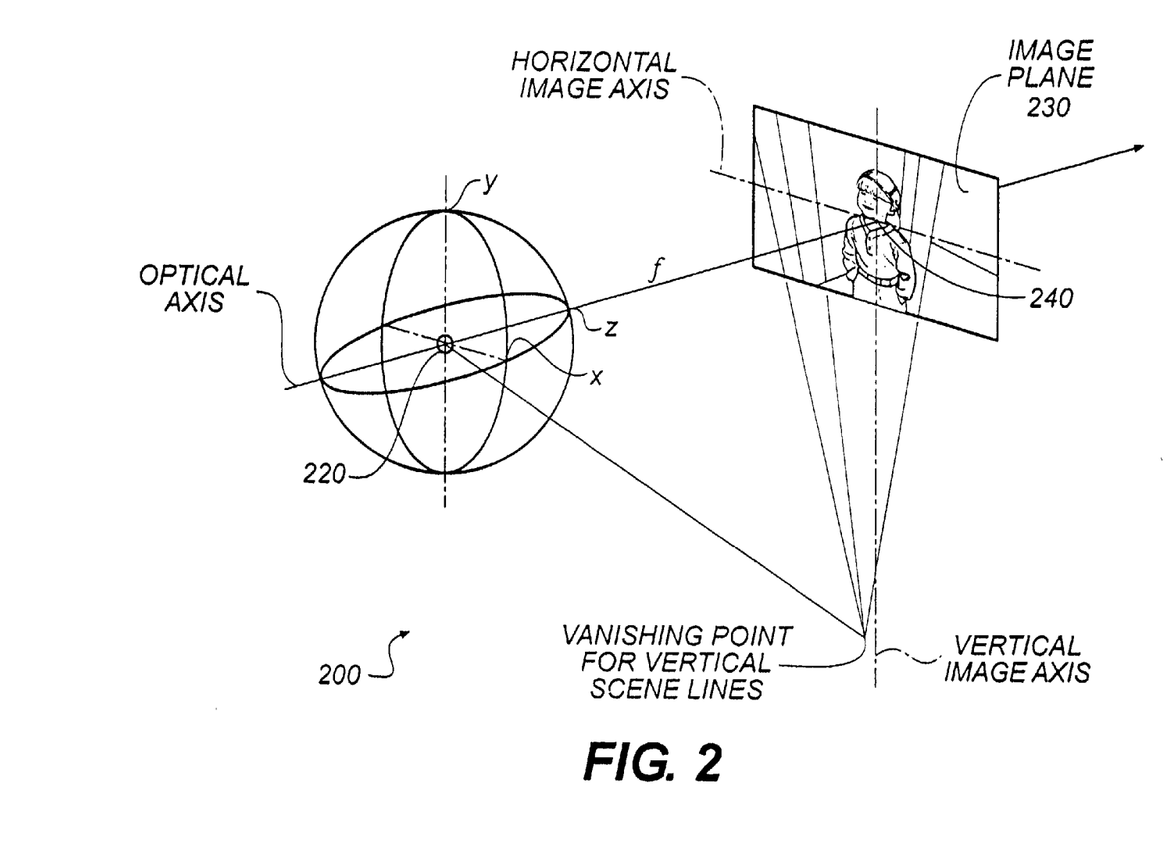
FIG. 2 is a schematic of the Cartesian coordinate system.

FIG. 2 shows a Cartesian coordinate system 200. A focal point 220, is located a distanced $f$ from an image plane 230. The focal point 220 represents the origin of the Cartesian system. The x-axis and y-axis define the dimensionality of the image plane 230. The z-axis is also the optical axis of the system. The x-axis and the y-axis define the xy-plane which is parallel to the image plane 230. An image origin 240 is defined as the point of intersection of the image plane with the optical axis and is given in Cartesian coordinates as (0,0,$f$). Generally, the image origin 240 is assumed to be at the center of the distribution of pixels comprising the digital image, although that is not necessarily the case.

FIG. 2 illustrates that there are several ways that the vanishing point location may be expressed, or more generally that any point on the image plane may be expressed. First, a vanishing point may be expressed as a location on the image plane. For instance, with regard to the image shown in FIG. 2, the vanishing point v may be expressed as the point at location v=($x_0$, $y_0$, $f$). Such a representation of the vanishing point location performs well when the vanishing point is located near the image origin, however, the coordinate locations along the x-axis and the y-axis may grow quite large.

Also illustrated in FIG. 2 is a vanishing point representation scheme commonly used in the field of vanishing point detection. In this representation, a Gaussian mapping is used to represent the vanishing point location. Thus, each location v on the image plane has a unique location $v_G$ on the Gaussian sphere. With reference to FIG. 2, the image plane is positioned to be the distanced from the optical origin of the system. Typically the distance $f$ is the focal length. If the focal length is unknown, then a reasonable guess may be used. In the preferred embodiment, the distance $f$ is the diagonal length of the image. In the case of the images with dimension 512 pixels by 768 pixels, the distance $f$ is set equal to 923. The vanishing point on the image plane may then be represented as the unit vector that points from the optical system origin to the vanishing point on the image plane. This vector is of length one and may be described as the coordinates of the intersection of a Gaussian sphere (a sphere of radius 1.0) centered at the optical system origin (the focal point), and the line passing through both the optical system origin and the vanishing point on the image plane. This vector representation of the vanishing point is advantageous because it contains the entire space of the image plane.

If the vanishing point location in the image plane v=($x_0$, $y_0$, $f$) is known, then the vanishing point vector may be determined by the following Gaussian mapping:

$$v_G = \frac{v}{|v|}$$

Likewise, if the vanishing point vector $v_G$=($x_G$, $y_G$, $z_G$) is known and the vanishing point location in the image plane is desired, then the following projection is used:

$$v = \frac{f v_G}{z}$$

In the preferred embodiment, the vanishing point vector is interchangeable with the vanishing point location given in Cartesian coordinates.

Figure 3:
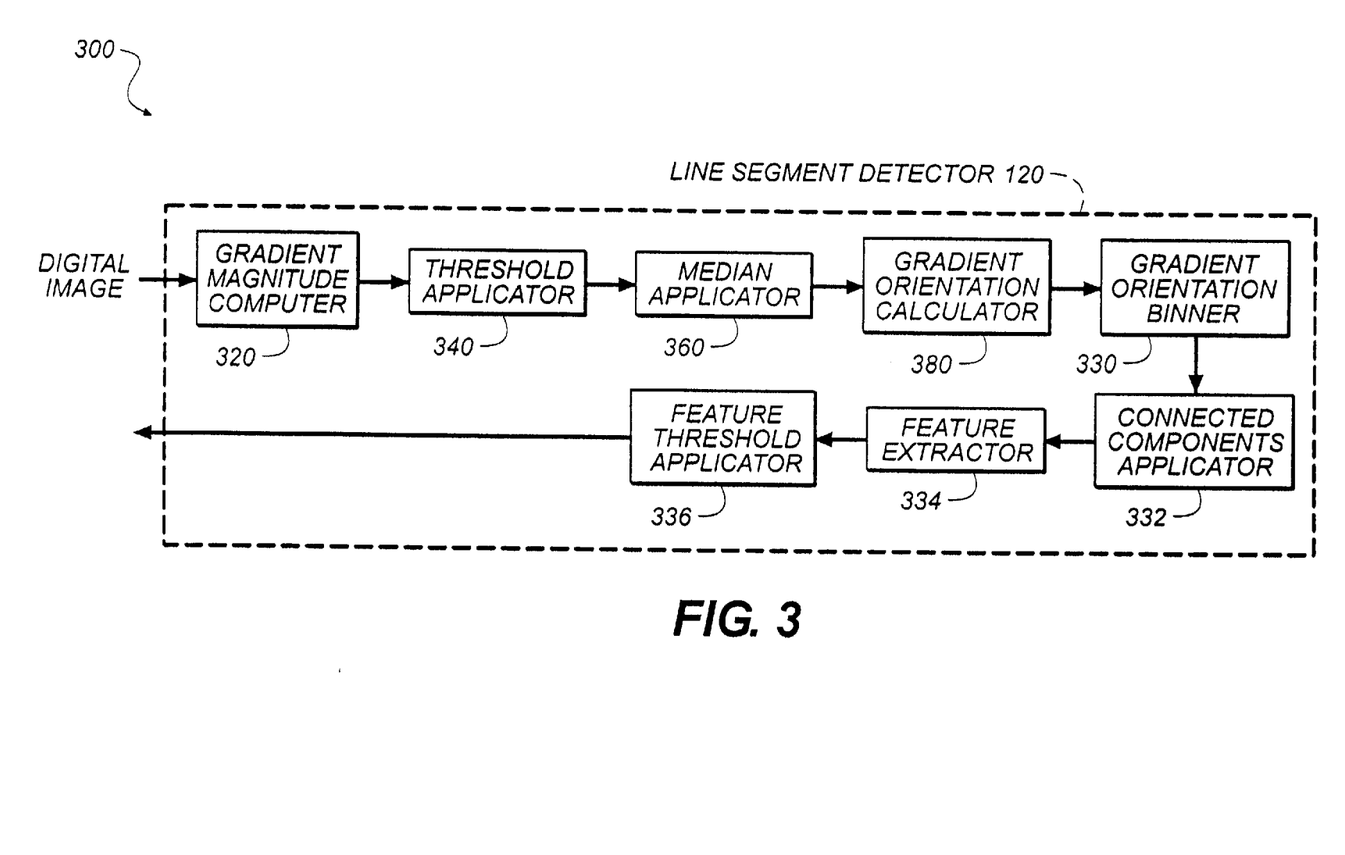
FIG. 3 is detailed block diagram of the line segment detector.

FIG. 3 is a detailed block diagram of the line segment detector 120 that determines line segments from the image. Those skilled in the art will recognize that the line segment detector 120 may be any number of algorithms used for the purpose of detecting line segments from an image signal.

FIG. 3 shows a detailed block diagram 300 of the line segment detector 120, and includes a gradient magnitude computer 320, a threshold applicator 340, a median applicator 360, a gradient orientation calculator 380, a gradient orientation binner 330, a connected components applicator 332, a feature extractor 334, and a feature threshold applicator 336.

In operation, the gradient magnitude computer 320 operates upon the digital image channel in order to compute a squared gradient magnitude at each location in the digital image channel. The squared gradient magnitude $G^2(x,y)$ at any pixel location may be approximated by the equations:

$$G_y(x,y) = n(x,y) - n(x,y-1)$$
$$G_x(x,y) = n(x,y) - n(x-1,y)$$
$$G^2(x,y) = G_x^2(x,y) + G_y^2(x,y)$$

The gradient magnitude computer 320 is followed with a threshold applicator 340, so it is unnecessary to compute the actual gradient. This avoids a costly square root operation. The gradient magnitude determined by the gradient magnitude computer 320 is input to the threshold applicator 340. For 12 bit images, squared gradient values greater than the threshold of $t_0$ where $t_0$=700 in the preferred embodiment are considered to be edges and squared gradient values below the threshold are considered to be non-edges. A binary map of the edge pixels is created from the threshold step and input to the median applicator 360.

The median applicator 360 applies to the binary map of edge pixels a median filter, as is commonly known in the art, to remove spurious signals. In the preferred embodiment, the median filter is a 3×3 median filter. The cleaned edge map is output from the median applicator 360 and input to the gradient orientation calculator 380.

The gradient orientation calculator 380 determines a gradient orientation $\angle G$ for each edge location in the cleaned edge map. The gradient orientation $\angle G$ is determined by the formula:

$$\angle G = \tan^{-1}\left(\frac{G_x}{G_y}\right)$$

The gradient orientation is used to determine a gradient orientation bin, as determined by the gradient orientation binner 330. In a preferred embodiment, eight bins may be used. The purpose of the gradient orientation binner 330 is to quantize the gradient orientation values to form a binned gradient image channel.

The binned gradient image channel created by the gradient orientation binner 330 is input to the connected components applicator 332. The purpose of the connected components applicator is to find spatially connected regions of pixels with a common gradient orientation bin value. Such a spatially connected region consists of N pixel locations and is commonly known as a line support region.

The pixel locations (x,y) and the corresponding pixel values of the digital image (as previously stated, the digital image consists of one or more digital image channels, in this case, a red channel r(x,y), a green channel g(x,y) and a blue channel b(x,y)) of pixels belonging to each line support region are passed (one line support region at a time) to the feature extractor 334 in order to compute feature values concerning the line support region. Eigenvalues and eigenvectors are computed from the covariance matrix of the pixel locations of the pixels belonging to the line support region. The principle axis of the line support region (the eigenvector corresponding to the largest eigenvalue) is a good measure of the line slope. Computing covariance matrices, eignevectors and eigenvalues is well known in the art and will not be further discussed. Additionally, the feature extractor 334 calculates a feature value Q equal to the ratio of the large eigenvalue to the small eigenvalue of the covariance matrix. The feature value Q corresponds to the feature: line quality. A large value of Q corresponds to an elongated line-like line support region and a small value of Q corresponds to a small rounded line support region that is probably of little value. In addition, the center of the line support region is calculated as $(x_c, y_c)$. Finally, the average color of the pixels $C_c$ belonging to the line support region is computed by averaging the values of the digital image channels as shown:

$$C_c = \begin{bmatrix} r_c \\ g_c \\ b_c \end{bmatrix} = \begin{bmatrix} \frac{1}{N}\sum r(x,y) \\ \frac{1}{N}\sum g(x,y) \\ \frac{1}{N}\sum b(x,y) \end{bmatrix}$$

where the summations occur over the N pixel locations of pixels belonging to the line support region only. The feature extractor 334 outputs for each line support region all of the feature values computed therein.

The feature values output by the line support region are input to the feature threshold applicator 336. The purpose of the feature threshold applicator 336 is to remove line segments that are small or of low quality. Any line segment with N, the number of pixels belonging to the line support region, less than a threshold $t_1$ is excluded from further processing. The threshold $t_1$ is 100 in the preferred embodiment. In addition, any line segment having a quality Q less than another threshold $t_2$ is excluded from further processing. The threshold $t_2$ is set at 200 in the preferred embodiment. The feature threshold applicator 336 outputs the M line segments and the associated feature value that passes this final threshold stage. The output of the feature threshold applicator 336 is also the output of the line segment detector 120. In summary, the line segment detector 120 performs a series of operations on an image signal for the purpose of determining line segments which are utilized by the present invention. As mentioned herein above, these M line segments, as determined from line segment detector 120 are then passed to the intersection computer 130. As used herein, the M line segments from the image are referred to by the labels $L_i$, where i=1, 2, ..., M. A specific attribute of a given line i is referred to by using the same line segment subscript. For example, $A_i$ refers to the attribute A associated with line segment $L_i$.

Figure 4:
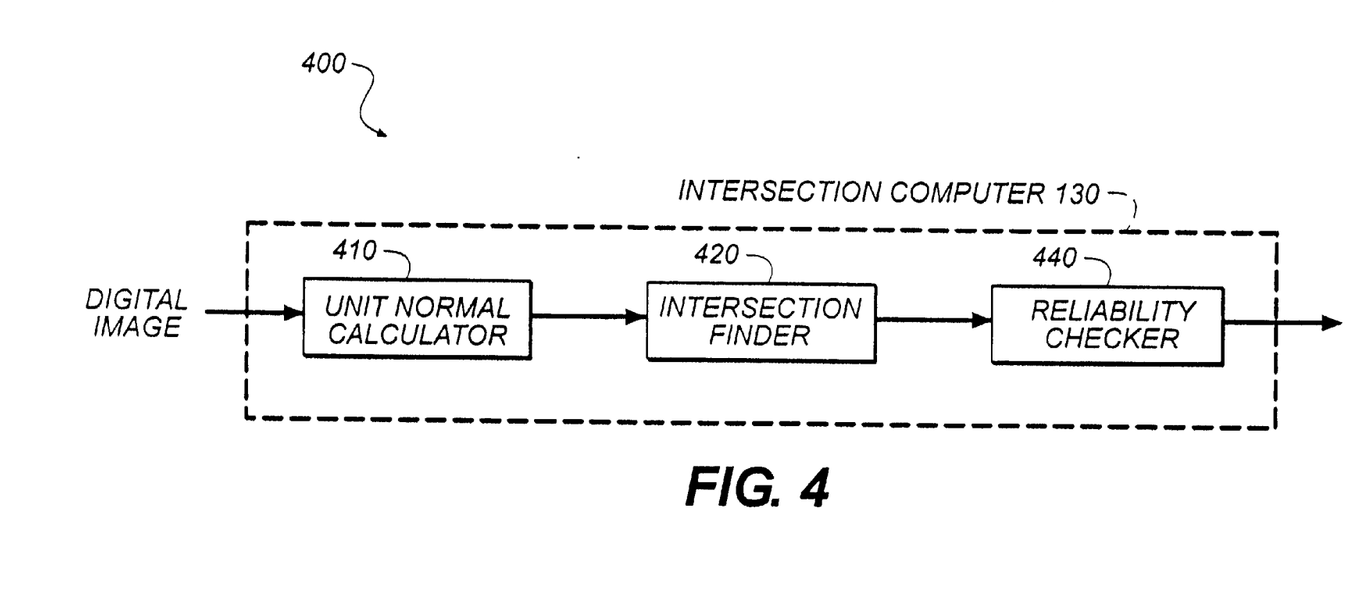
FIG. 4 is detailed block diagram of the intersection computer.

FIG. 4 shows a detailed block diagram 400 of the intersection computer 130, and includes a unit normal calculator 410, an intersection finder 420, and a reliability checker 440. In operation, each of the M line segments is first passed to the unit normal calculator 410 to compute a unit vector normal to the plane passing through the focal point and containing the line segment (see FIG. 5).

Figure 5:
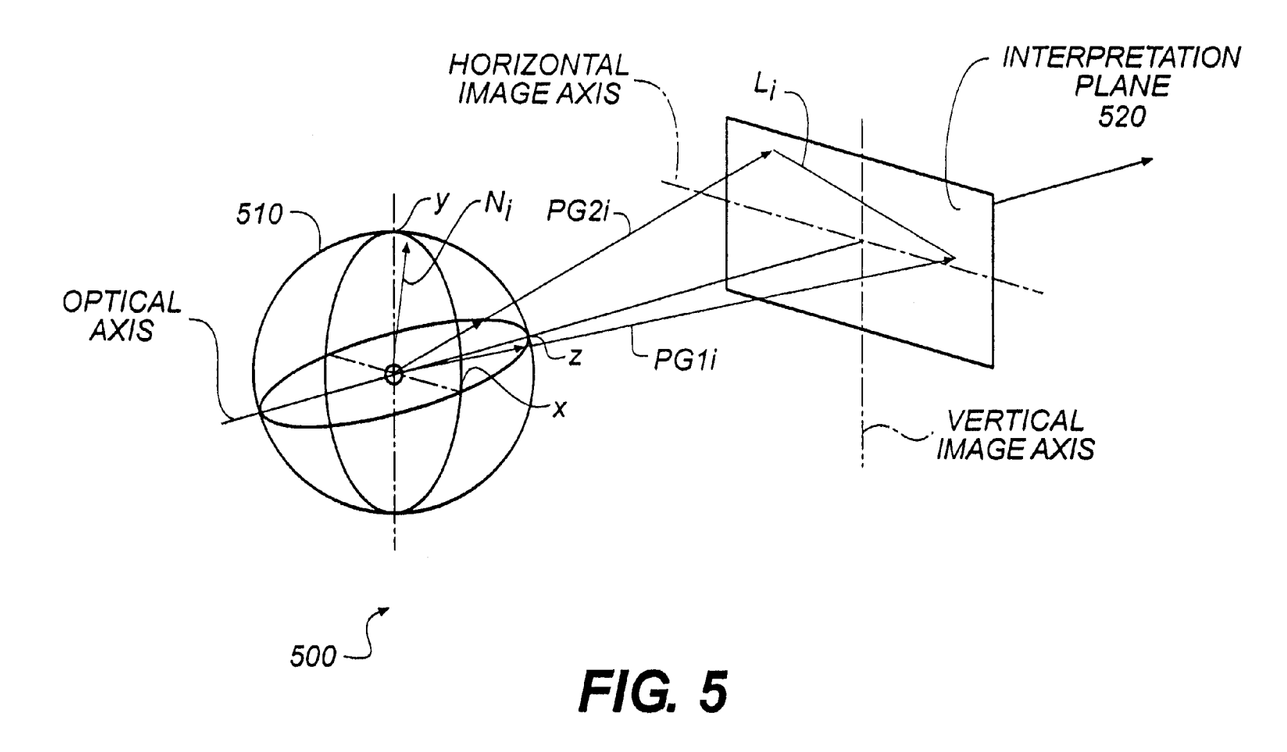
FIG. 5 shows an example of a line segment and a unit vector normal of this invention.

FIG. 5 shows an example 500 of a line segment and a unit vector normal of this invention. Referring to FIG. 5, the plane passing through the focal point and containing the line segment is referred to, by those ordinarily skilled in the art, as the interpretation plane 520.

As shown by FIG. 5, line segment $L_i$ has endpoints $p_{1i}(x_1, y_1, f)$ and $p_{2i}(x_2, y_2, f)$. These endpoints may be represented as unit vectors by mapping onto a Gaussian sphere 510 as previously described. The vector $p_{G1i}$ is a unit vector in the direction from the focal point to $p_{1i}$.

The unit normal $N_i$ to the interpretation plane associated with line segment $L_i$ may be computed by the following equation using cross product operations:

$$N_i = \frac{p_{G1i} \times p_{G2i}}{|p_{G1i} \times p_{G2i}|}$$

The unit normal calculator 410 appends the unit normal to the features associated with each given line segment. The unit normal calculator 410 then outputs the M line segments to the intersection finder 420.

The intersection finder 420 determines the Gaussian vector representation of the intersection $I_{ij}$ of any two line segments $L_i$ and $L_j$ by the following equation, again utilizing cross product operations:

$$I_{ij} = \frac{N_i \times N_j}{|N_i \times N_j|}$$

The intersection $I_{ij}$ of two line segments $L_i$ and $L_j$ is a unit vector which points from the focal point to the point on the image plane where the line segments $L_i$ and $L_j$ would cross if these line segments were to be extended. Note that intersection finder 420 selects all possible pairs of line segments $L_i$ and $L_j$ for computing the intersection $I_{ij}$ of line segments $L_i$ and $L_j$. Each possible pair of line segments is considered for calculation of an intersection $I_{ij}$. The intersection finder 420 then outputs the list of $M(M-1)/2$ intersections unique to the reliability checker 440.

The operation of the reliability checker 440 in FIG. 4 is to exclude intersections that cannot aid in the determination of the vanishing point. In order to perform this operation, the reliability checker 440 analyzes both the intersection $I_{ij}$ and the component line segments $L_i$ and $L_j$. The intersection may be excluded for two reasons. First, if the line segments are collinear (i.e. $N_i=N_j$) then the intersection $I_{ij}$ is excluded. Secondly, if the intersection $I_{ij}$ occurs between the end points of either of the two component line segments, then that intersection is also excluded. Thus, the reliability checker 440 outputs a maximum of $M(M-1)/2$ intersections.

Figure 6:
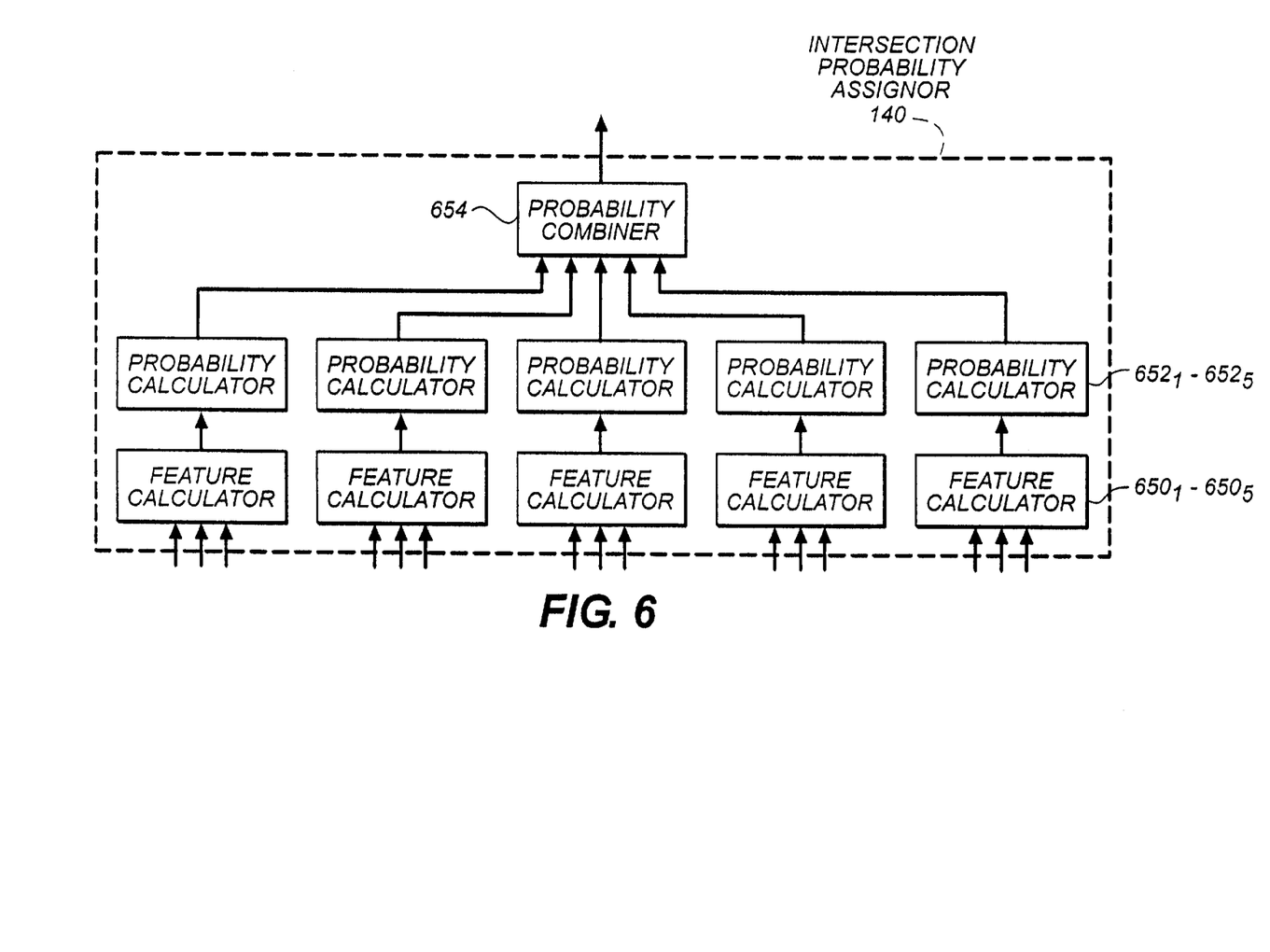
FIG. 6 is detailed block diagram of an intersection probability determiner.

Referring to FIG. 6, the intersection probability assignor includes several feature value calculators $650_1$ through $650_5$, and several probability calculators $652_1$ through $652_5$, and a probability combiner 654. In operation, the intersections and the line segments are input to the intersection probability assignor 140. Rather than assume that each intersection $I_{ij}$ has equal importance, a probability $p_{ij}$ is assigned to each intersection. Let V be the event that an intersection $I_{ij}$ is coincident with a ground truth vanishing point $v_G$. (If the angle $d_{ij}$ measured in radians between the intersection $I_{ij}$ and the nearest ground truth vanishing point represented as a Gaussian vector is less than a threshold $t_3$, then that intersection is coincident with the vanishing point $v_G$. In the preferred embodiment, the threshold $t_3 = 0.1$.) The probability $p_{ij}$ is then the probability of V, given what is known about the corresponding line segments $L_i$ and $L_j$. Within the intersection probability determiner 140, Bayesian reasoning is used to determine $p_{ij}$ from an analysis of ground truth data.

Several features $F_1, F_2, \ldots, F_h, \ldots, F_H$ are calculated for each intersection $I_{ij}$ within the intersection probability assignor 140 by the feature calculators 650 as shown in FIG. 6 for H =5. Each feature is derived from the attributes of the intersection $I_{ij}$ and the line segments $L_i$ and $L_j$. Using ground truth data gathered from an analysis of 86 images, the posterior probability $P(V|F_h)$ is easily determined. This operation may be performed for any number of features.

In the present invention, five features are used. Feature $F_1$ is operated upon by the feature value calculator $650_1$. The feature value calculator $650_1$ outputs the value of the feature $F_1$ for the intersection $I_{ij}$ to the probability calculator $652_1$. The purpose of the probability calculator $652_1$ is to determine the posterior probability $P(V|F_h)$. Therefore, given a feature $F_h$ associated with line segments $L_i$ and $L_j$, the probability that the intersection $I_{ij}$ is coincident to a vanishing point is represented by the posterior probability $P(V|F_h)$. The posterior probability is dependent upon the nature and value of the feature. For example, where the feature is the minimum length of line segments $L_i$ and $L_j$, a smaller feature value corresponds to a lower probability of finding a vanishing point coincident to the intersection $I_{ij}$, and a larger feature value corresponds to a higher probability of finding a vanishing point coincident to the intersection $I_{ij}$. A Look-Up-Table (LUT) operation is performed to determine the value of $P(V|F_h)$ based upon the value of the feature $F_h$. This posterior probability $P(V|F_h)$ may be referred to as a feature value coefficient, since it is a value derived from the feature $F_h$. Note that in the preferred embodiment, the feature value coefficient is identical with the posterior probability. A similar operation is performed for each of the features. Note that those skilled in the art will recognize that the number of features may vary and that changing the number of features or the exact formulation of the features is not a significant deviation relative to this embodiment.

Figure 7:
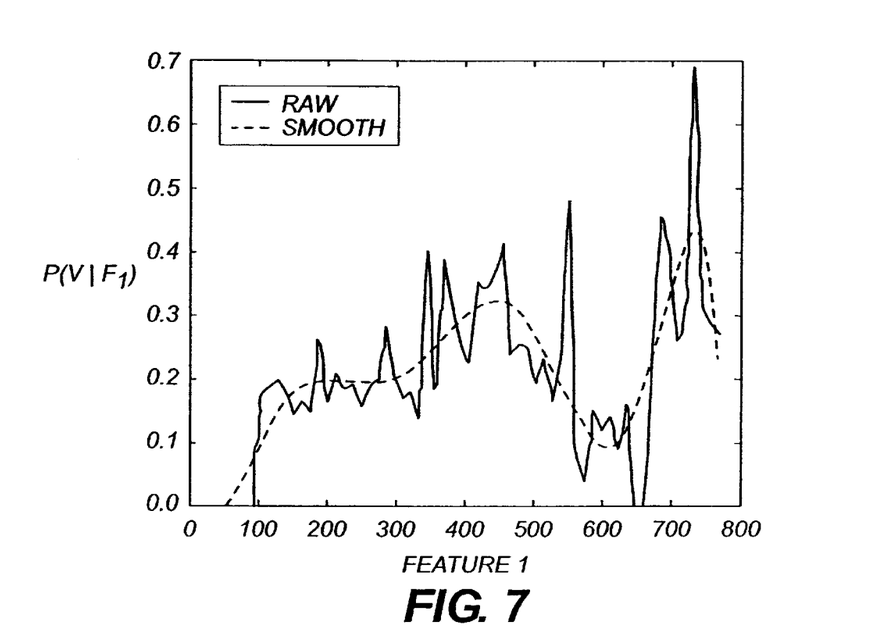
FIG. 7 shows a plot of the posterior probability of the feature $F_1$.

The feature $F_1$ is the smaller of the length of the line segments $L_i$ and $L_j$. The probability $P(V|F_1)$ is shown in FIG. 7. The feature value calculator $650_1$ outputs the value of the feature $F_1$ for the intersection $I_{ij}$ to the probability calculator $652_1$. The purpose of the probability calculator $652_1$ is to determine the posterior probability $P(V|F_1)$. Both the raw and smoothed versions of the probability $P(V|F_1)$ are shown, however, the smoothed version is used by the probability calculator $652_1$ in this case.

Figure 8:
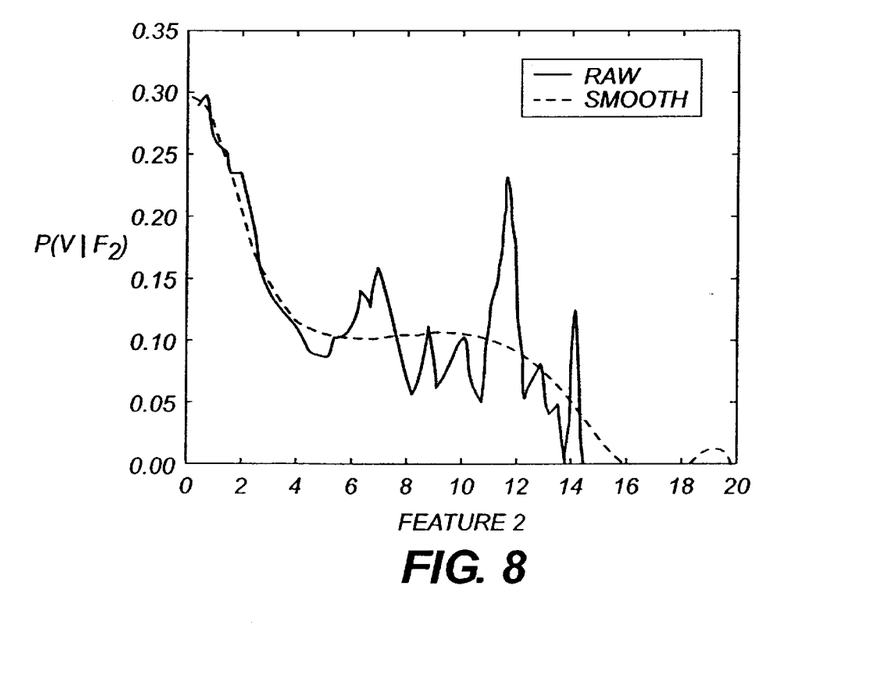
FIG. 8 shows a plot of the posterior probability of the feature $F_2$.

The feature $F_2$ is difference between the average colors $C_{ci}$ and $C_{cj}$ of the line segments $L_i$ and $L_j$, respectively. This distance is calculated as a Mahalonobis distance, which is well known in the art of pattern recognition. The probability $P(V|F_2)$ is shown in FIG. 8. The feature value calculator $650_2$ outputs the value of the feature $F_2$ for the intersection $I_{ij}$ to the probability calculator $652_2$. The purpose of the probability calculator $652_2$ is to determine the posterior probability $P(V|F_2)$.

Figure 9:
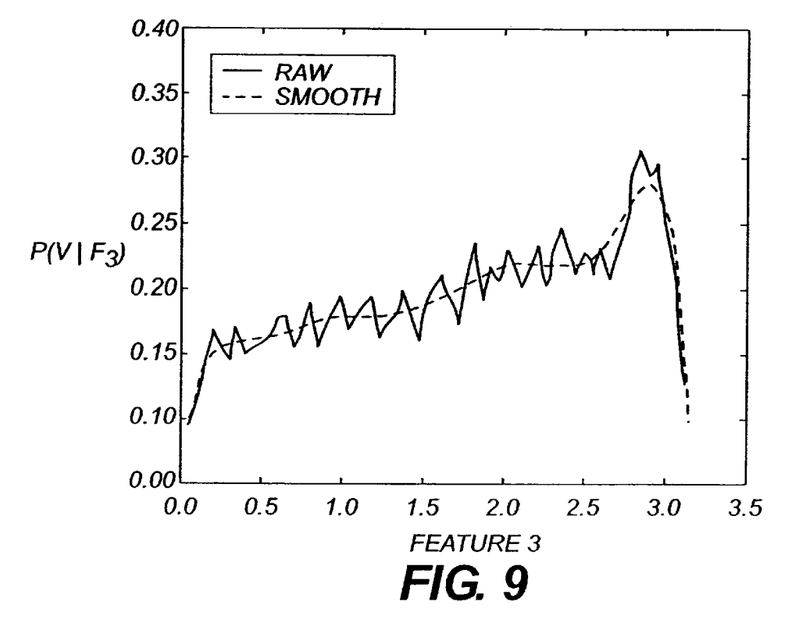
FIG. 9 shows a plot of the posterior probability of the feature $F_3$.

The feature $F_3$ $650_3$, is the angle between the neutral axis and the vector connecting the average color of the line segments $L_i$ and $L_j$. The probability $P(V|F_3)$ is shown in FIG. 9. The feature value calculator $650_3$ outputs the value of the feature $F_3$ for the intersection $I_{ij}$ to the probability calculator $652_3$. The purpose of the probability calculator $652_3$ is to determine the posterior probability $P(V|F_3)$.

Figure 10:
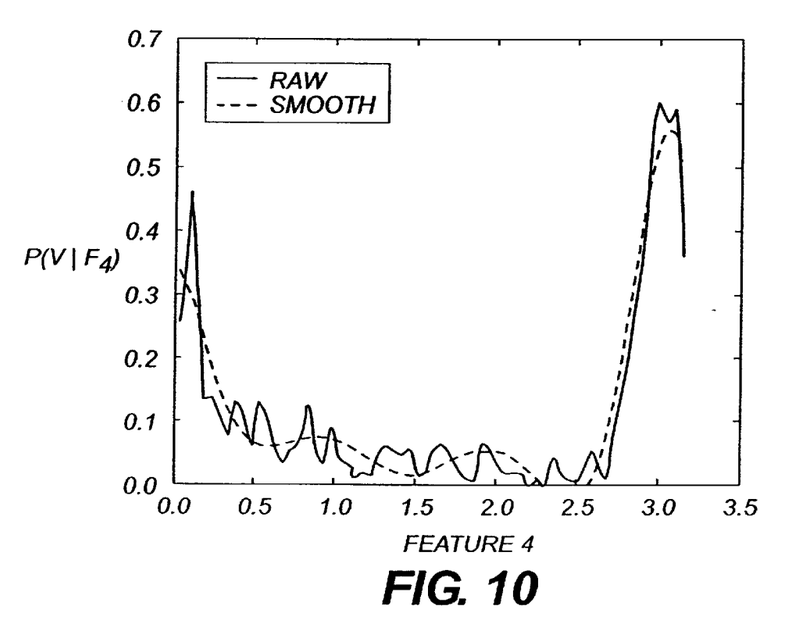
FIG. 10 shows a plot of the posterior probability of the feature $F_4$.

The feature $F_4$ $650_4$ is determined from the difference in the angle between the line segments $L_i$ and $L_j$. The probability $P(V|F_4)$ is shown in FIG. 10. The feature value calculator $650_4$ outputs the value of the feature $F_4$ for the intersection $I_{ij}$ to the probability calculator $652_4$. The purpose of the probability calculator $652_4$ is to determine the posterior probability $P(V|F_4)$.

Figure 11:
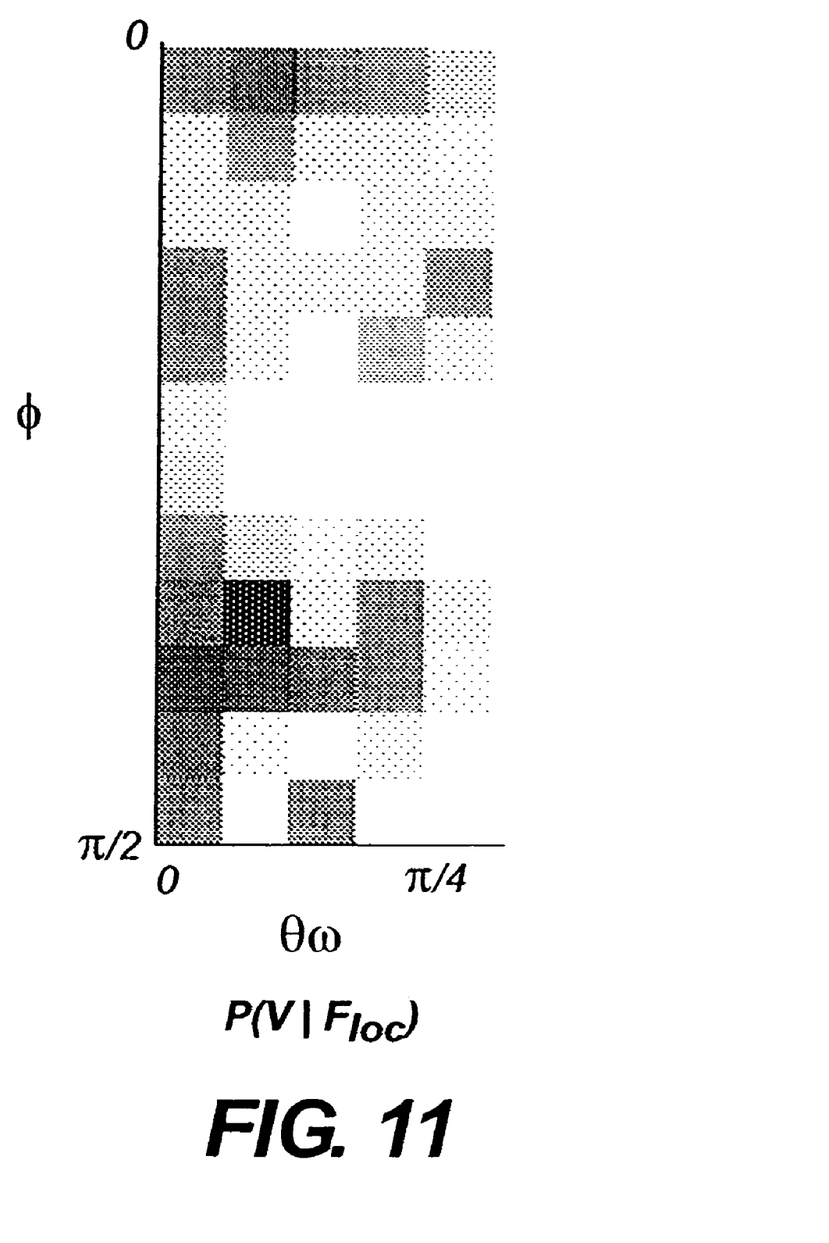
FIG. 11 shows a plot of the posterior probability of the feature $F_5$.

The feature $F_5$ $650_5$ is solely based upon the intersection location $I_{ij}$. This location is expressed in terms of $\phi$ and $\theta_w$.

$$\phi = \cos^{-1}(^zGI).$$
$$\theta_w = \theta_v \quad \text{if } \theta_v < \pi/4$$
$$\theta_w = \pi/2 - \theta_v \quad \text{if } \theta_v >= \pi/4$$

where $\theta_v = |\tan^{-1}(y_{GI}/x_{GI})|$ and $I_{ij}$ is represented by the Gaussian mapping $(x_{GI}, y_{GI}, z_{GI})$.

The angle $\phi$ is the angle from the optical axis to the Gaussian representation of the intersection $I_{ij}$. The angle $\phi$ ranges from 0 to $\pi/2$. The angle $\theta_w$ is the smallest angle from the projection of the intersection onto the xy-plane to the nearest of the x-axis or the y-axis. As such, the angle $\theta_w$ is limited between 0 and $\pi/4$. The probability $P(V|F_5)$ is shown in FIG. 11; wherein darker shades or more dense patterns represent higher probabilities.

Thus, in the preferred embodiment for each intersection $I_{ij}$ determined from line segments $L_i$ and $L_j$ there are five posterior probabilities, i.e. feature value coefficients. These probabilities may be combined using Bayes theorem by the probability combiner 654 to determine the value $p_{ij}$:

$$p_{ij} = P(V|F_{1ij}, F_{2ij}, \ldots, F_{Hij}) = \frac{P(V|F_{1ij})P(V|F_{2ij}) \ldots P(V|F_{Hij})}{P(V)^{H-1}}$$

Numerous feature value coefficients are combined for each pair of line segments $L_i$ and $L_j$ to determine the value of $p_{ij}$, which will be applied by subsequent processing steps of the present invention for determining vanishing point location in an image. The Bayes theorem equation above essentially multiplies various feature value coefficients in order to determine a value $p_{ij}$, hence an overall feature value coefficient.

In the preferred embodiment, the value of P(V) was experimentally determined as 0.191.

The intersection probability assignor 140 outputs each intersection $I_{ij}$ and the associated probability $p_{ij}$. The clusterer 150 performs a clustering of the intersections $I_{ij}$ using the associated probabilities $p_{ij}$ as weights. In the preferred embodiment, the clusterer 150 is a constrained weighted K-means clustering algorithm. The K-means algorithm is known commonly in the field of pattern recognition. In the preferred embodiment, W clusters (where W=20) are used in hopes that the cluster means corresponds with local maxima. The constrained weighted K-means algorithm by the clusterer 150 differs from the traditional K-means algorithm in the following respects: first, the vector representations of the cluster means are constrained to have a magnitude of 1.0 (as are the intersections $I_{ij}$.); second, the probability $p_{ij}$ associated with the intersection $I_{ij}$ is considered when computing the cluster means. Each cluster mean $C_W$ is computed as a weighted average (with the probability $p_{ij}$ being the weight on $I_{ij}$) of the intersection members rather than computing the cluster mean as a straight average. Therefore, the weighted K-means allows the cluster means to gravitate toward the intersection locations with highest confidence (i.e. by using high feature value coefficients.) The clusterer 150 outputs the cluster means $C_W$.

The maximum finder 160 then inputs the cluster means $C_W$, the intersections $I_{ij}$ and the corresponding probabilities $p_{ij}$. The maximum finder 160 examines each cluster mean $C_W$ to select the most likely vanishing point. For each cluster mean $C_W$, only the intersections within a certain radial threshold are considered. An intersection is considered for cluster mean $C_W$ when angle $d_{ij}$ measured in radians between the intersection $I_{ij}$ and the cluster mean $C_W$ represented as a Gaussian vector is less than a threshold $t_4$, then that intersection is coincident with the vanishing point $v_G$. In the preferred embodiment, the threshold t4=0.1.

The maximum finder 160 determines a score $S_W$ corresponding to each cluster mean $C_W$ from the associated intersections $I_{ij}$ and probabilities $p_{ij}$ that are considered to be close enough to the cluster mean as described herein above.

In the preferred embodiment, the score $S_W$ is calculated as follows:

$$S_w = -\sum_{i,j} \log(1 - p_{ij})$$

where the summation occurs only over those intersections that are considered close enough to the cluster mean $C_W$. After the score has been computed for each cluster mean, the maximum finder determines the cluster mean corresponding to the maximum score. This cluster mean is the estimate of the vanishing point vector $v_E$.

Those skilled in the art will recognize that there are many methods by which data may be clustered to determine a local maximum. For example, the score may alternatively be determined by either of the following two equations:

$$S_w = -\sum_{i,j} p_{ij} \quad S_w = \prod_{i,j} (1 - p_{ij})$$

where the subscripts ij refer to only those intersections sufficiently close to the cluster mean as previously described. The maximum finder outputs the estimate of the vanishing point vector and may also output the value of the score $S_W$ associated with the vanishing point vector $v_E$. This score $S_W$ may be used by further applications as a measure of strength or validity.

As previously mentioned, additional vanishing points may be estimated by inputting to the line segment assigner 170 the M line segments and the estimated vanishing point vector $v_E$. The line segment assigner 170 assigns to the estimated vanishing point vector $v_E$ all those line segments that likely pass sufficiently close to the estimated vanishing point. The definition of sufficiently close is determined by taking the dot product of the line segment normal $N_i$ with the estimated vanishing point vector $v_E$. If this dot product is less than threshold t4, wherein the preferred embodiment t4=0.1, then the line segment $L_i$ is assigned to the estimated vanishing point $v_E$. All unassigned line segments are input to the intersection computer 130 to repeat the process until the desired number of vanishing points is obtained or until the number of unassigned line segments falls below the threshold t4. Typically, the number of vanishing points is not greater than three.

Once again referring to FIG. 1, the vanishing point detector 100 outputs the locations of all vanishing points identified for the image. Typically, the number of vanishing points determined for a single image is not greater than three, although this should not be viewed as a limitation. As previously mentioned, the vanishing points determined for the image are output in the form of vanishing point vectors. Assuming that M vanishing points are determined for the digital image, the output of the vanishing point detector may be represented as $v_{Gm}$, where m ranges from 1 to M. Alternatively, it is possible that no vanishing points may be determined for the digital image. In this event, then the present invention can draw no conclusions regarding format or orientation of the image solely from vanishing point locations.

One aspect of the present invention provides a method for determining the vanishing points related to an image. The method includes the steps detecting line segments in the image; determining intersections from pairs of line segments; assigning a probability to each intersection of the pairs of line segments for associated probabilities; clustering the intersections using the associated probabilities as weights to generate a plurality of cluster means; determining a local maximum corresponding to the plurality of cluster means and outputting an estimate vanishing point vector; assigning the estimated vanishing point vector line segments that pass sufficiently close to the estimated vanishing point vector for finding additional vanishing points; and repeating the process until a desired number of vanishing points is obtained.

In some embodiments of the method just described, the feature value is related to the color of the line segment, the line segment length, the coordinates of the intersection. In one embodiment, the feature value is the line segment length provided by a smallest line segment. In other embodiments, the feature value may be related to a difference in angle of the pairs of line segments, related to a difference between an average color of the line segments, or related to an angle between a neutral axis and a vector connecting the average color of the line segments. In still other embodiments, the feature value coefficient is related to the probability that the intersection is coincident with an accurate vanishing point having a correlating greater probability, wherein the feature value is greater. Alternatively, some embodiments of the present invention include the feature value coefficient related to the probability that the intersection is coincident with an accurate vanishing point having a correlating lesser probability, wherein the feature value is lesser.

In other example embodiments of the described method, providing at least $F_{Hij}$ feature value coefficients, wherein H=5, multiplying the at least $F_{Hij}$ feature value coefficients, and determining an overall feature value coefficient are further included. The method may also include the steps of selecting a cluster of high feature value coefficients from the intersection, and locating the vanishing point using the cluster.

Another aspect of the present invention has a method of determining the vanishing points related to an image, the method including the steps of: determining line segments in the image; determining color features related to the line segments; and applying the color features to locate the vanishing point.

The present invention has yet another aspect: an overall system for locating a vanishing point in a photographic image, including a line segment detector for outputting a list of line segments; an intersection computer for finding an intersection of each possible pair of line segments in the list of line segments; an intersection probability determiner for assigning a posterior probability to the intersection; a clusterer for inputting the intersection and corresponding probability, and performing a clustering operation using the probability as weight to determine a cluster means; a maximum finder for considering a fixed region size about the cluster means and determines a corresponding score; and a line segment assignor for assigning line segments to the vanishing point.

In some embodiments of the present invention a subsystem of the line segment detector include: a gradient magnitude computer for operating upon a digital image channel in order to compute a squared gradient magnitude at each location in the digital image channel; a threshold applicator for determining edges of a digital image based on a threshold value; a median applicator for applying a binary map of edge pixels to remove spurious signals; a gradient orientation calculator, wherein a gradient orientation value is determined for each edge location in a cleaned edge map; a gradient orientation binner, wherein the gradient orientation binner quantifies the gradient orientation value to form a binned gradient image channel; a connected components applicator for finding spatially connected regions of pixels with a common gradient orientation bin value; a feature extractor, wherein features concerning a line support region are computed; and a feature threshold applicator, wherein line segments that are of low quality are removed.

In some embodiments of the present invention a subsystem of the intersection computer includes a unit normal calculator, wherein the unit normal calculator appends a unit normal to features associated with each given line segment; an intersection finder, wherein the intersection finder determines a Gaussian vector representation of the intersection of any two line segments; and a reliability checker, wherein the intersection that cannot aid in determining the vanishing point is excluded.

In some embodiments of the present invention a subsystem of the intersection probability determiner includes a plurality of feature calculators, wherein a plurality of features are calculated for each intersection; a plurality of probability calculators for determining a plurality of posterior probabilities; and a probability combiner, wherein the plurality of posterior probabilities are combined.

Several other embodiments of the present invention include a computer program product for performing each of the above mentioned methods.

It is to be understood that the above description is merely intended to be illustrative and not restrictive. For instance, the steps of the various methods in the appended claims may or may not be performed in the listed order. Additionally, many other embodiments and variations will be apparent to those skilled in the art. Therefore those skilled in the art will recognize that many variations may be made to the description of the present invention without significantly deviating from the scope of the present invention. The scope of the invention should therefore be determined with reference to the appended claims along with the full scope of equivalents to which such claims are entitled.

| PARTS LIST | |
|---|---|
| 100 | vanishing point locator system |
| 120 | line segment detector |
| 130 | intersection computer |
| 140 | intersection probability assignor |
| 150 | clusterer |
| 160 | maximum finder |
| 170 | line segment assignor |
| 200 | Cartesian coordinate system |
| 220 | focal point |
| 230 | image plane |
| 240 | image origin |
| 300 | detailed block diagram of line segment detector 120 |
| 320 | gradient magnitude computer |
| 330 | gradient orientation binner |
| 332 | components applicator |
| 334 | feature extractor |
| 336 | feature threshold applicator |
| 340 | threshold applicator |
| 360 | median applicator |
| 380 | gradient orientation calculator |
| 400 | detailed block diagram of intersection computer 130 |
| 410 | unit normal calculator |
| 420 | intersection finder |
| 440 | reliability checker |
| 500 | Cartesian coordinate system with line segment and unit vector normal |
| 510 | Gaussian sphere |
| 520 | interpretation plane |
| $650_1$–$650_5$ | feature value calculators |
| $652_1$–$652_5$ | probability calculators |
| 654 | probability combiner |

What is claimed is:

1. A method of determining a vanishing point related to an image, the method comprises the steps of:
    (a) detecting line segments in the image;
    (b) determining intersections from pairs of line segments;
    (c) assigning a probability to each intersection of the pairs of line segments;
    (d) determining a local maximum corresponding to a plurality of probabilities; and
    (e) outputting an estimated vanishing point vector vE that corresponds to the determined local maximum such that an estimated location of the vanishing point about the estimated vanishing point vector $v_E$ results.

2. The method as recited in claim 1, wherein the step of determining a local maximum further comprises the steps of:
    (i) clustering the intersections using the plurality of probabilities as weights to generate cluster means;
    (ii) determining the local maximum corresponding to the plurality of cluster means; and
    (iii) outputting the estimated vanishing point location from the local maximum corresponding to the plurality of cluster means.

3. The method as recited in claim 1, wherein the step of assigning a probability includes the step of calculating a feature value that is related to a color of the line segment.

4. The method as recited in claim 1, wherein the step of assigning a probability includes the step of calculating a feature value that is related to line segment length.

5. The method as recited in claim 4, wherein the feature value is the line segment length provided by a smallest line segment.

6. The method as recited in claim 1, wherein the step of assigning a probability includes the step of calculating a feature value that is related to coordinates of the intersection.

7. The method as recited in claim 1, wherein the step of assigning a probability includes the step of calculating a feature value that is related to a difference in angle of the pairs of line segments.

8. The method as recited in claim 3, wherein the feature value is related to a difference between an average color of the line segments.

9. The method as recited in claim 8, wherein the feature value is related to an angle between a neutral axis and a vector connecting the average color of the line segments.

10. The method as recited in claim 1, wherein the step of assigning a probability includes the step of calculating a feature value coefficient related to the probability that the intersection is coincident with an accurate vanishing point having a correlating greater probability, wherein the feature value is greater.

11. The method as recited in claim 1, wherein the step of assigning a probability includes the step of calculating a feature value coefficient related to the probability that the intersection is coincident with an accurate vanishing point having a correlating lesser probability, wherein the feature value is lesser.

12. The method as recited in claim 1, wherein the step of assigning a probability further comprises the steps of:
(i) providing at least $F_{Hij}$ feature value coefficients, wherein
(ii) multiplying the at least $F_{Hij}$ feature value coefficients; and
(iii) determining an overall feature value coefficient.

13. The method recited in claim 12, wherein the step of assigning a probability further comprising the steps of:
(iv) selecting a cluster of high feature value coefficients from the intersection; and
(v) locating the vanishing point using the cluster.

14. A method of determining the vanishing point related to an image, the method comprising the steps of:
a) determining line segments in the image;
b) measuring color features related to differences in color found between pairs of line segments; and
c) applying the color features to locate the vanishing point.

15. The method as recited in claim 14, wherein the step of applying color features further comprises the steps of:
(i) determining intersections from pairs of line segments; and
(ii) applying the color features and the intersections to output a vanishing point location.

16. The method as recited in claim 15, wherein the step of applying color features further comprises the steps of:
(i) assigning a probability, based on the color features, to each of the intersecting pairs of line segments; and
(ii) determining a local maximum corresponding to each probability assigned to the intersecting pairs of line segments, and outputting an estimated vanishing point location.

17. A system for locating a vanishing point in a photographic image, comprises:
a) a line segment detector for outputting a list of line segments;
b) an intersection computer for finding an intersection of each possible pair of line segments in the list of line segments;
c) an intersection probability determiner for assigning a posterior probability to the intersection;
d) a clusterer for inputting the intersection and corresponding probability, and performing a clustering operation using the probability as weight to determine a cluster means;
e) a maximum finder for considering a fixed region size about the cluster means and determines a corresponding score; and
f) a line segment assignor for assigning line segments to a vanishing point vector such that the location of the vanishing point is found.

18. The system claimed in claim 17, wherein the line segment detector further comprises:
(i) a gradient magnitude computer for operating upon a digital image channel in order to compute a squared gradient magnitude at each location in the digital image channel;
(ii) a threshold applicator for determining edges of a digital image based on a threshold value;
(iii) a median applicator for applying a binary map of edge pixels to remove spurious signals;
(iv) a gradient orientation calculator, wherein a gradient orientation value is determined for each edge location in a cleaned edge map;
(v) a gradient orientation binner, wherein the gradient orientation binner quantifies the gradient orientation value to form a binned gradient image channel;
(vi) a connected components applicator for finding spatially connected regions of pixels with a common gradient orientation bin value;
(vii) a feature extractor, wherein features concerning a line support region are computed; and
(viii) a feature threshold applicator, wherein line segments that are of low quality are removed.

19. The system claimed in claim 17, wherein the intersection computer further comprises:
(i) a unit normal calculator, wherein the unit normal calculator appends a unit normal to features associated with each given line segment;
(ii) an intersection finder, wherein the intersection finder determines a Gaussian vector representation of the intersection of any two line segments; and
(iii) a reliability checker, wherein the intersection that cannot aid in determining the vanishing point is excluded.

20. The system claimed in claim 17, wherein intersection probability assignor further comprises:
(i) a plurality of feature calculators, wherein a plurality of features are calculated for each intersection;
(ii) a plurality of probability calculators for determining a plurality of posterior probabilities; and
(iii) a probability combiner, wherein the plurality of posterior probabilities are combined.

21. A computer storage medium having instructions stored therein for causing a computer to perform the method of claim 1.

22. A computer storage medium having instructions stored therein for causing a computer to perform the method of claim 2.

23. A computer storage medium having instructions stored therein for causing a computer to perform the method of claim 3.

24. A computer storage medium having instructions stored therein for causing a computer to perform the method of claim 4.

25. A computer storage medium having instructions stored therein for causing a computer to perform the method of claim 5.

26. A computer storage medium having instructions stored therein for causing a computer to perform the method of claim 6.

27. A computer storage medium having instructions stored therein for causing a computer to perform the method of claim 7.

28. A computer storage medium having instructions stored therein for causing a computer to perform the method of claim 8.

29. A computer storage medium having instructions stored therein for causing a computer to perform the method of claim 9.

30. A computer storage medium having instructions stored therein for causing a computer to perform the method of claim 10.

31. A computer storage medium having instructions stored therein for causing a computer to perform the method of claim 11.

32. A computer storage medium having instructions stored therein for causing a computer to perform the method of claim 12.

33. A computer storage medium having instructions stored therein for causing a computer to perform the method of claim 13.

34. A computer storage medium having instructions stored therein for causing a computer to perform the method of claim 14.

35. A computer storage medium having instructions stored therein for causing a computer to perform the method of claim 15.

36. A computer storage medium having instructions stored therein for causing a computer to perform the method of claim 16.

* * * * *